United States Patent
Taguchi et al.

(10) Patent No.: US 6,817,645 B2
(45) Date of Patent: Nov. 16, 2004

(54) SEAT ARRANGEMENT FOR A VEHICLE

(75) Inventors: Tomoo Taguchi, Aku-Gun (JP); Keiichiro Shibata, Aku-Gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/388,227

(22) Filed: Mar. 14, 2003

(65) Prior Publication Data

US 2003/0234551 A1 Dec. 25, 2003

(30) Foreign Application Priority Data

Mar. 14, 2002 (JP) .......................................... 2002-070465
Mar. 14, 2002 (JP) .......................................... 2002-070527

(51) Int. Cl.⁷ .............................. B60N 2/005; B60N 2/12
(52) U.S. Cl. .................. 296/64; 296/65.05; 296/65.08; 296/65.12; 297/336
(58) Field of Search ................................ 296/64, 65.05, 296/65.08, 65.11, 65.12; 297/232, 236, 243, 335, 336, 383

(56) References Cited

U.S. PATENT DOCUMENTS 6,338,516 B1 * 1/2002 Toyota et al. ............... 296/37.2
6,582,003 B2 * 6/2003 Fourrey et al. ................ 296/64
6,648,392 B2 * 11/2003 Fourrey et al. ........... 296/65.09
2002/0017797 A1 * 2/2002 Jach et al. ................ 296/65.09

FOREIGN PATENT DOCUMENTS

FR          2707934 A1 * 1/1995   .................. 297/383
JP          11-255010       9/1999
JP          2000-264109     9/2000

* cited by examiner

*Primary Examiner*—D. Glenn Dayoan
*Assistant Examiner*—Greg Blankenship
(74) *Attorney, Agent, or Firm*—Nixon Peabody, LLP; Donald R. Studebaker

(57) ABSTRACT

A seat arrangement for a vehicle includes a first row of seats, a second row of seats mounted behind the first row of seats in a vehicular cabin, and a third row of seats mounted behind the second row of seats in the cabin. A second row seat is slidable in the longitudinal direction, and a seat cushion of the third row seat can be pivoted about a pivotal axis in the vicinity of its front edge into the upright position. When the seat cushion of the third row seat is in the upright position and the second row seat is slid rearwardly, the seat cushion of the third row seat and the second row seat are positioned closely with each other. The second row seat can slide rearwardly without interference from the step on the floor or rear wheel housings bulging out into a cabin.

21 Claims, 9 Drawing Sheets

SEAT ARRANGEMENT FOR A VEHICLE

FIELD OF THE INVENTION

The present invention relates to a seat arrangement for a vehicle, more particularly, to a seat arrangement of three rows of seats that can be arranged in various modes in the cabin of the vehicle.

DESCRIPTION OF THE RELATED ART

In recent years, need for versatility in automobiles is increasing. Various kinds of structures, represented by seat arrangements for example, have been proposed which permits the vehicle to accommodate various configurations of a cabin area for enhancing the attraction of the vehicle. For example, Japanese Unexamined Patent Publication 2000-264109 proposes a second row seats that are rearwardly slidable. This structure advantageously creates a large space between the second row seats and the forward seats. The space enhances comfort for passengers seated in the seats of the second row, and offers various use of the space in conformity with the passengers' needs.

On the other hand, another seat arrangement for enhancing utility has been known, which can transform an area occupied by the seat into a luggage area in the cabin. Such an arrangement is disclosed in Japanese Unexamined Patent Publication H11-255010, which comprises a seat cushion which is pivotable about the pivotal axis in the vicinity of the front seat-cushion edge so as to be arranged into an upright position and a reversed position with its lower surface facing up and placed on a vehicular floor. Accordingly, with the seat cushion being in the upright position, a space which had been occupied by the seat cushion that allows the passenger to be seated thereon, can be used as a luggage area. Alternatively, with the seat cushion in the reversed position, a space created on the lower surface of the seat cushion can be,Also used as a luggage area.

The structures disclosed above may be combined so that the seat in a configuration disclosed in Japanese Unexamined Patent Publication H11-255010 is mounted behind the second row seats in a configuration disclosed in Japanese Unexamined Patent Publication 2000-264109 to provide three rows of seats in the vehicle. The vehicle equipped with such a combination increases the seating capacity of the vehicle by the arrangement of the third row seats into the state where passengers can be seated therein, and also achieves the enlargement of the luggage area by the arrangement of the third row seats and enlargement of a space in front of the second row seats by the rearward slide of the second row seats. In other words, a novel seat arrangement is achieved, in which an area occupied by the third row seats is used as the luggage area while a large space is obtained in front of the second row seats.

In a vehicle with a cabin relatively smaller in its longitudinal length, however, the longitudinal slidable length of the second row seats is limited in the case that the three rows of seat are longitudinally mounted. That is, the second row seats is not allowed to rearwardly slide past the front edge of the third row of seats. Moreover, rear wheel housings commonly bulge out into the cabin from the opposite sides, which limits the slidable length of the second row seats. Additionally, for mounting a fuel tank or other components on the bottom surface of the vehicle, the vehicular floor is often formed with a step, which also limits the slidable length of the second row seats. That is, the simple combination of the structure of Japanese Unexamined Patent Publication 2000-264109 and the structure of Japanese Unexamined Patent Publication H11-255010 merely provides either the benefit from the rearward slide of the second row seats, or the benefit from the arrangement of the third row seats, at any given occasion. Though the second row seats can be rearwardly slid while the third row seats is arranged to provide enlarged luggage area, slidable length of the second row seats are limited, which offers little improvement in utility. Rather, the increased cost due to the combined structure may impair the attraction of the vehicle.

Further, the mere combination of the structures disclosed in the two patent publications suffers from the drawback as will be described. That is, in the reversed position of the seat cushion of the third row seat which provides a luggage space thereon, when a passenger on the second row seat tries to rearwardly slide the seat, the seat cushion of the third row seat interferes with the sliding motion of the second row seat, which limits length of the rearward slide of the second row seats. In other words, to further slide the second row seat in the reversed state of the third row seat, the passenger on the second row seat is forced to take a series of bothersome actions of leaving seat, pivoting the third row seat, and then sliding the second row seat rearwardly, all of which are unfavorable in easing operation.

SUMMARY OF THE INVENTION

In view of the problem above, a first object of the present invention is to provide a seat arrangement for a vehicle, having three rows of seats in the cabin, which achieves at once, the enlarged luggage area by the arrangement of the third row of seats and the enlarged area in front of the second row seats by rearward longitudinal slide of the second row seats. A second object of the present invention is to enhance ease of operation of the third row seats for sliding the second row seats rearwardly, in a state where the third row seat has been arranged so as to interfere with the slidable range of the second row seats to expand a luggage area, in the seat arrangement for a vehicle.

In accordance with the first aspect of the present invention, there is provided a seat arrangement for a vehicle, including a first row of seats constituting a driver seat and a front passenger seat; a second row of seats mounted behind the first row of seats in a cabin of the vehicle; and a third row of seats mounted behind the second row of seats in the cabin, the second row of seats comprising: a second row seat with a seat cushion horizontally disposed in substance and a seat back vertically disposed in substance from the vicinity of the rear edge of the seat cushion; and a sliding mechanism slidably supporting the second row seat in vehicular longitudinal direction between a forward position and a rearward position, and the third row of seats comprising: a third row seat with a seat cushion and a seat back; and a supporting mechanism supporting the third row seat so as to selectively permit the third row seat to be arranged into a first state where the seat cushion is substantially horizontal with its padded surface facing up and the seat back is substantially vertical with its padded surface facing forwardly, or a second state where the seat cushion is forwardly pivoted about a pivotal axis in the vicinity of the front edge of the seat cushion into a substantially upright position.

Accordingly, when the second row seat is slid up to the rearward position while the third row seat is arranged so that an area which had been occupied by the third row seat can be used as a luggage area, or the seat cushion of the third row seat is in the upright position, the rear surface of the seat back of the second row seat and the seat cushion surface of the third row seat in the upright position abut on each other. Therefore, the rear surface of the seat back of the second row seat and the seat cushion surface of the third row seat can entirely contact with each other with little or no clearance there between, which maximizes the rearward slidable length of the second row seat, so that a large space is created in front of the second row seat while an area which had been occupied the third row seat can be used as a luggage area at once.

Preferably, a recess may be formed on the rear surface of the seat back of the second row seat so that the seat cushion of the third row seat in the upright position fits therein when the third row seat is in the second state and the second row seat is slid up to the rearward position.

Accordingly, when the second row seat is slid up to the rearward position while the third row seat is arranged so that an area which had been occupied by the third row seat can be used as a luggage area, or the seat cushion of the third row seat is in the upright position, the seat cushion of the third row seat in the upright position fits into the recess formed on the rear surface of the seat back of the second row seat. Therefore, the slidable length of the second row seat rearwardly is extended by the amount corresponding to the depth of the recess, which permits the second row seat to slide further rearwardly while an area which had been occupied the third row seat can be used as a luggage area. In addition, the visual appearance from the rear is improved when the seats are in such a state.

More preferably, the vehicle may include: a front floor on which the second row seat is mounted via the sliding mechanism; a rear floor on which the third row seat is mounted via the supporting mechanism; and a step connecting the front floor and the rear floor so that the rear floor is situated higher than the front floor, and a sliding mechanism comprising: a rail extending on the front floor up to the vicinity of the step; and a slider guided by the rail and supporting the second row seat so that the lower surface of the second row seat is situated higher than the rear floor, wherein at least the rear edge of the second row seat may be located above the rear floor when the second row seat is in the rearward position.

Accordingly, the raised portion of the floor, on which the third row seat is mounted, leaves a space beneath the floor for accommodating the various components, and allows the second row seat to slide further rearwardly without the interference with the step.

Further preferably, the second row seats may comprise a right side seat and left side seat substantially disposed laterally, a laterally displacing mechanism may be provided on at least one of the right side seat and the left side seat, for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other may be smaller than a clearance between rear wheel housings bulging out into the cabin of the vehicle from the opposite sides, and the sliding mechanism and the laterally displacing mechanism may permit the second row seats to be positioned between the rear wheel housings with the second row seats laterally abutting on each other in the rearward position.

Accordingly, in the case that the third row seat is disposed between the rear wheel housings because of the cabin being relatively shorter in longitudinal length, the second row seat is permitted to slide up to the rearward position without interfering with the rear wheel housings. In other words, even in a vehicle with, a relatively smaller cabin, the second row seat can slide further rearwardly while an area which had been occupied the third row seat can be used as a luggage area.

Still further preferably, the laterally displacing mechanism may be capable of fixing the right side seat and the left side seat in the state where they are laterally separated with each other in the forward position of the second row seats. Accordingly, the second row seats can be laterally separated to provide individual seats in the forward position, which enhances the utility of the seats.

Still further preferably, the supporting mechanism may be capable of supporting the seat back of the third row seat so that the seat back is forwardly folded down onto the floor of the vehicle with its rear surface facing upwardly when the third row seat is in the second state. Accordingly, the seat back of the third row seat is forwardly folded down onto the floor with its rear surface facing up in the second state of the third row seat, so that the surface of the seat serves as a floor of the luggage area, thereby achieving the enlarged luggage area.

Still further preferably, the supporting mechanism may be capable of supporting the seat cushion of the third row seat so that the seat cushion of the third row seat is in a third state of being forwardly pivoted about the pivotal axis in the vicinity of the front edge of the seat cushion of the third row seat into the substantially horizontal position with the padded surface of the seat cushion facing down, and the rear edge of the second row seat at the forward position may be located ahead of the front edge of the seat cushion of the third row seat in the third state, the rear edge of the second row seat at the rearward position being located rearward of the front edge of the seat cushion of the third row seat in the third state.

Accordingly, the state is achieved where a large space is created in front of the second row seat while an area which had been occupied by the third row seat can be used as a luggage area by forwardly pivoting the seat cushion of the third row seat after forwardly sliding the second row seat results in a luggage area with a floor surface comprising of the rear surface of the third row seat, to thus enhance the utility.

In accordance with the second aspect of the present invention, there is provided a seat arrangement for a vehicle including, a first row of seats having a driver seat and a front passenger seat, a second row of seats mounted behind the first row of seats in a vehicular cabin, and a third row of seats mounted behind the second row of seats in the cabin, the second row of seats comprising: a second row seat comprising a seat cushion horizontally disposed in substance and a seat back vertically disposed in substance from the vicinity of the rear edge of the seat cushion; and a sliding mechanism slidably supporting the second row seat in vehicular longitudinal direction between a forward position and a rearward position, the third row of seats comprising: a third row seat with a seat cushion and a seat back; and a supporting mechanism which supports the seat cushion of the third row seat so as to selectively permit the seat cushion to be arranged into a seating position where the seat cushion is substantially horizontal with its padded surface facing up, an upright position where the seat cushion is pivoted about a pivotal axis disposed in the vicinity of the frontal edge of the seat cushion so as to be upright, or a reversed position where the seat cushion is pivoted about the pivotal axis so as to be horizontal with its padded surface facing down. The rear edge of the second row seat is located ahead of the frontal edge of the seat cushion of the third row seat in the reversed position when the second row seat is in the forward position, and is located rearward of the frontal edge of the seat cushion of the third row seat in the reversed position when the second row seat is in the rearward position. The seat arrangement also includes an uprighting device via which the sliding of the second row seat to the rearward position causes the seat cushion of the third row seat to shift into the upright position, when the second row seat is in the forward position and the seat cushion of the third row seat is in the reversed position.

Accordingly, in a vehicle having three rows of seats in the cabin, the second row of which is slidable rearwardly, and the third row of which is arranged so that an area which had been occupied by the seat cushion thereof can be used as a luggage area, the seat cushion of the third row seat is automatically shifted from the reversed position into the upright position by the rearward slide of the second row seat. Thus, a passenger on the second row seat can slide the second row seat without necessity of leaving the seat for manually operating the seat cushion of the third row seat into the upright position, thereby enhancing ease of operation.

Preferably, the uprighting device may comprise: a spring biasing the seat cushion of the third row seat rearwardly about the pivotal axis; a cam disposed on the supporting mechanism and formed with notches corresponding to the reversed position and the upright position of the seat cushion respectively; an engaging portion provided on the seat cushion and releasably engaging with the notch for selectively locking the seat cushion in the reversed position or the upright position corresponding to the respective notches; and an interlocking device which interlocks the third row seat with the second row seat so that the rearward slide of the second row seat releases the engagement between the engaging portion and the notch corresponding to the reversed position and achieves the engagement between the engaging portion and the notch corresponding to the upright position.

Accordingly, the uprighting device is mechanically constructed, which simplifies the construction of the uprighting device.

Alternatively, the uprighting device may comprise: an actuator which rotates the seat cushion of the third row seat about the pivotal axis; a sensor which detects the rearward slide of the second row seat; and a controller which is electrically connected with the actuator and the sensor, wherein, the controller sends a signal to the actuator for rotating the seat cushion, in response to the signal from the sensor.

Accordingly, the pivotal movement of the seat cushion is electrically achieved, which enables the rotation of the seat cushion to be more properly controlled. That is, the pivoting velocity of the seat cushion can be easily adjusted in view of safety, for example.

More preferably, the second row seat may be constructed so as to forwardly slide while the seat cushion of the third row seat maintains the upright position, when the second row seat is in the rearward position and the seat cushion of the third row seat is in the upright position.

Accordingly, when the seat cushion of the third row seat is in the upright position and the second row seat is in the rearward position, or when a third row seat is arranged so as to provide a luggage area and a large space is provided in front of the second row seat, the second row seat can slide forwardly while keeping the seat cushion of the third row seat in the upright position. Thus, a space is provided behind the second row seat and in front of the seat cushion of the third row seat in the upright position, thereby enhancing the utility. That is, for example, a passenger can put packages onto the space from the second row seat.

Further preferably, a reversing device may be provided via which the forward slide of the second row seat causes the seat cushion of the third row seat to shift into the reversed position, when the second row seat is in the rearward position and the seat cushion of the third row seat is in the upright position.

Accordingly, when the seat cushion of the third row seat is in the upright position and the second row seat is in the rearward position, or when a third row seat is arranged so as to provide a luggage area and a large space is provided in front of the second row seat, the seat cushion of the third row seat is caused to pivot forwardly from the upright position into the reversed position by the operation of the passenger to slide the second row seat forwardly. That is, it is necessary for the passenger only to slide the second row seat forwardly in expanding the luggage area, with no need for operating the third row seat, which enhances ease of operation.

Still further preferably, the second row of seats may comprise a right side seat and left side seat substantially disposed laterally, a laterally displacing mechanism may be provided on at least one of the right side seat and the left side seat, for permitting at least one of the right side seat and the left side seat to be displaced between a state where the right side seat and the left side seats are laterally separated and a state where the right side seat and the left side seat are disposed next to each other, wherein the lateral length over the right side seat and the left side seat in the state where they are disposed next to each other may be smaller than a clearance between rear wheel housings bulging out into the cabin of the vehicle from the opposite sides, so that the sliding mechanism and the laterally displacing mechanism permits the second row seats to be positioned between the rear wheel housings with the second row seats laterally abutting on each other in the rearward position.

Accordingly, in the case that the third row seat is disposed between the rear wheel housings because of the cabin is relatively shorter in longitudinal length, the second row seat is permitted to slide up to the rearward position without interfering with the rear wheel housings. In other words, even in a vehicle with a relatively smaller cabin, the second row seat can slide further rearwardly while an area which had been occupied the third row seat can be used as a luggage area.

Other features, aspects, and advantages of the present invention will become apparent from the following description of the invention which refer to the accompanying drawings.

DETAILED DESCRIPTION OF THE INVENTION

Figure 1:
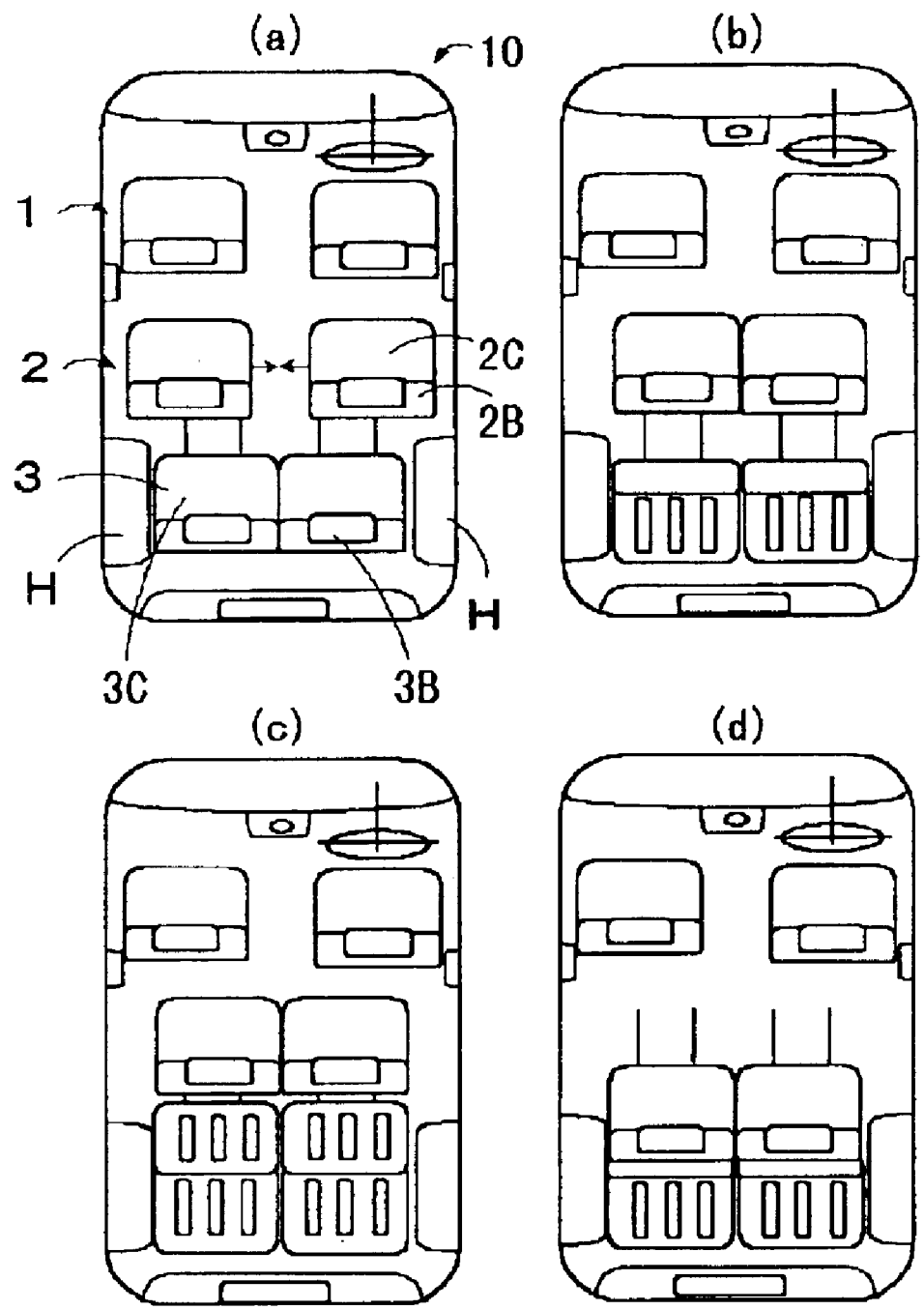
FIGS. 1(a)–(d) are schematic top plan views showing respective modes of seat arrangement accommodated by a vehicle equipped with seats in accordance with the present invention.

The preferred embodiment of the present invention will be described with reference to FIG. 1 to FIG. 4. Firstly, the arrangements of seats in accordance with the present invention will be described in general with reference to FIG. 1, which illustrates a schematic top plan view of the cabin of a vehicle provided with seats in accordance with the present invention. Reference numerals are applied only to FIG. 1(a) and omitted in FIGS. 1(b) to (d), because the illustrated elements are common among FIGS. 1(a) to (d).

As shown in FIG. 1(a), a vehicle 10 is provided with three rows of seats 1, 2, and 3 along the vehicular longitudinal direction in the cabin. The first row seats 1 define a driver seat and front passenger seat. The second row seats 2 comprise of two seats laterally divided and slidable in both longitudinal and lateral direction of the vehicle. Thus, the seats 2 can be arranged so as to laterally abut on each other, or to form a so-called bench seat after being displaced towards the middle of the vehicle, and can be slid in the longitudinal direction while keeping the bench seat configuration. The third row seats 3 comprise of two seats laterally divided and comprising respective seat backs 3B and seat cushions 3C pivotably supported as will be described in detail. With the constitution above, the present invention accommodates four modes of seat arrangement shown in FIGS. 1(a) to (d), through the arrangement of the second row seats 2 and the third row seats 3.

FIG. 1(a) shows the mode in which passengers can be seated on each seat constituting the respective seat rows 1, 2, and 3 (referred to herein as first mode). In the first mode, six passengers in total can be seated on the seats.

FIG. 1(b) shows the mode in which the seat cushions 3C of the third row seats 3 have been pivoted about a pivotal axis in the vicinity of the front seat cushion edge into the upright position, and the seat backs 3B of the third row seats 3 have been forwardly folded down (referred to herein as second mode). In the second mode, seat cushions 3C in the upright position separate the space behind the second row seats 2 into the front luggage area and the rear luggage area, and the rear surface of the seat backs 3B serve as a floor of the rear luggage area. Thus, with a tail gate (not shown) being open, luggage can be loaded onto or unloaded from the rear luggage area therethrough. In addition, passengers on the second row seats can put luggage onto the front luggage area or reach for luggage on the front luggage area while seated on the seats. It should be noted that the second row seats 2 shown in FIG. 1 are in the bench seat configuration which is a state after the right side seat and the left side seat are displaced in the direction indicated by the arrows thereof.

FIG. 1(c) shows the mode in which the seat cushions 3C have been further pivoted into the reversed position, from the second mode shown in FIG. 1(b) (referred to herein as third mode). In the third mode, a large luggage area is created behind the second row seats 2 with a continuous floor constituted by the lower surfaces of the seat cushions 3C and the rear surfaces of the seat backs 3B. Thus, with the tail gate (not shown) being open, luggage can be loaded onto or unloaded from the large luggage area created by the arrangement of the third row seats 3.

FIG. 1(d) shows the mode in which the second row seats 2 in the bench seat state have been rearwardly slid until they abut the seat cushions 3C in the upright position of the second mode shown in FIG. 1(b) (referred to herein as fourth mode). In the fourth mode, a large area is created in front of the second row seats 2, and a luggage area is created behind the second row seats 2 with a floor constituted by the rear surface of the seat backs 3B. As apparent from FIG. 1(d), although rear wheel housings H bulge out from opposite sides to the proximity of both sides of the third row seats 3 in the cabin, the width of the bench seat comprising of the second row seats 2 is smaller than the clearance between the rear wheel housings H, so that the second row seats 2 can be rearwardly slid into a space between the rear wheel housings H without interference. Then, passengers can be comfortably seated on the second row seats 2 while stretching out their legs, or can utilize the area created in front of the second row seats in various ways while using the area behind the second row seats 2 as the luggage area.

FIG. 1(a) shows the second row seats 2 which can be separately displaced laterally. In this case, a detachable seat may be provided between the separated seats, for creating a continuous seating surface in cooperation with the second row seats.

A sliding mechanism for the second row seats 2 will now be described with reference to FIG. 2. The description will be made for one of the left side seat, because the second row seats 2 comprise of two seats that are substantially symmetrically constructed.

Figure 2:
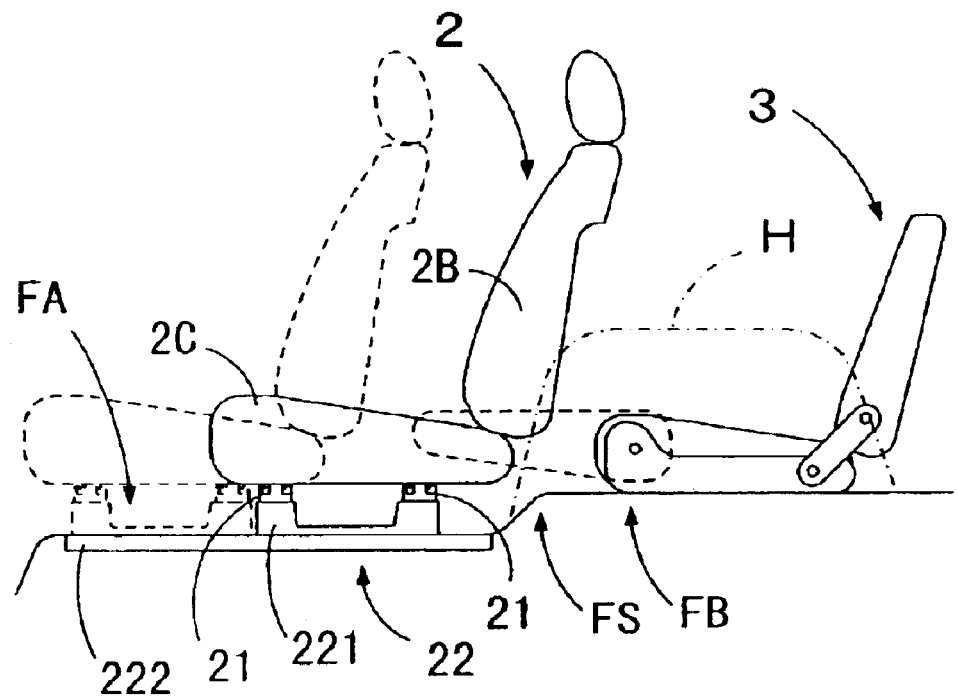
FIG. 2 is a schematic side view of the seat arrangement of the vehicle in the first mode as shown in FIG. 1(a)

FIG. 2 illustrates a schematic side view of the vehicle in the first mode, or in the state shown in FIG. 1(a). As shown, the second row seat 2 comprises a seat cushion 2C and a seat back 2B coupled with each other. The second row seat 2 is mounted on the vehicular body via a laterally sliding mechanism 21 and a longitudinally sliding mechanism 22. The laterally sliding mechanism slidably supports a seat cushion 2C laterally; and the longitudinally sliding mechanism 22 slidably supports the laterally sliding mechanism 21 longitudinally.

Particularly, the laterally sliding mechanism 21 comprises two sliding rails and two fixed rails. The sliding rails are disposed on the lower surface of the seat cushion 2C so as to be spaced apart longitudinally and extend laterally. The fixed rails slidably receive the sliding rails laterally. The longitudinally sliding mechanism 22 comprises two seat bases 221 (one of which is illustrated in FIG. 2) and two floor rails 222 (one of which is illustrated in FIG. 2). The respective seat bases 221 connect the lateral ends of the two fixed rails. The floor rails 222 slidably support the respective seat bases longitudinally.

The laterally sliding mechanism 21 is provided with a locking mechanism (not shown) between the sliding rail and the fixed rail, for laterally locking both the second row seats 2 selectively in the laterally separated state and the bench seat state in the middle of the cabin. Also, the longitudinally sliding mechanism 22 is provided with a locking mechanism (not shown) between the seat base 221 and the floor rail 222, for locking the seat base 221 in a desired position with respect to the floor rail 222. Thus, the mechanisms concurrently allow the second row seats 2 to laterally slide into the separated state or the bench seat state, and to be fixed at a desired position along the vehicular longitudinal direction. The locking mechanism may be well-known locking mechanisms for fixing seats in a desired position used in conventional slidable seat systems.

A vehicular floor is formed with two steps rising upwardly to define a front floor FA on which the second row seats 2 are mounted and a rear floor FB on which the third row seats 3 are mounted. A space created beneath the floors accommodates a fuel tank and other components.

On the front floor FA, the floor rails 222 are fixed. The floor rail 222 extends longitudinally across the front floor portion FA so that its rear end reaches in the vicinity of the step FS between the front floor FA and the rear floor FB. Thus, the second row seat 2 can slide between a first state and a second state. When the second row seat 2 is in the first state (as indicated by solid lines in FIG. 2), its rear edge is positioned rearward of the location at which the front edge of the seat cushion 3C would be positioned if the seat cushion 3C were reversed (as indicated by broken lines in FIG. 2). When the second row seat 2 is in the second state (indicated by broken lines in FIG. 2), its rear edge is positioned ahead of the location at which the front edge of the seat cushion 3C would be positioned if the seat cushion 3C were reversed (as indicated by broken lines in FIG. 2).

The height difference between the lower surface of the seat cushion 2C and the front floor FA is greater than that between the rear floor FB and the front floor FA, which permits the second row seat 2 to slide to the rearmost position along the floor rail 222 without interference between the lower surface of the seat cushion 2C and the rear floor FB. Accordingly, the second row seat 2 can slide over such a great length along the floor rail 222 that the rear edge of the second row seat 2 is located above the rear floor FB without interference with the rear floor FB when the second row seat 2 slides to its rearmost position.

Figure 4:
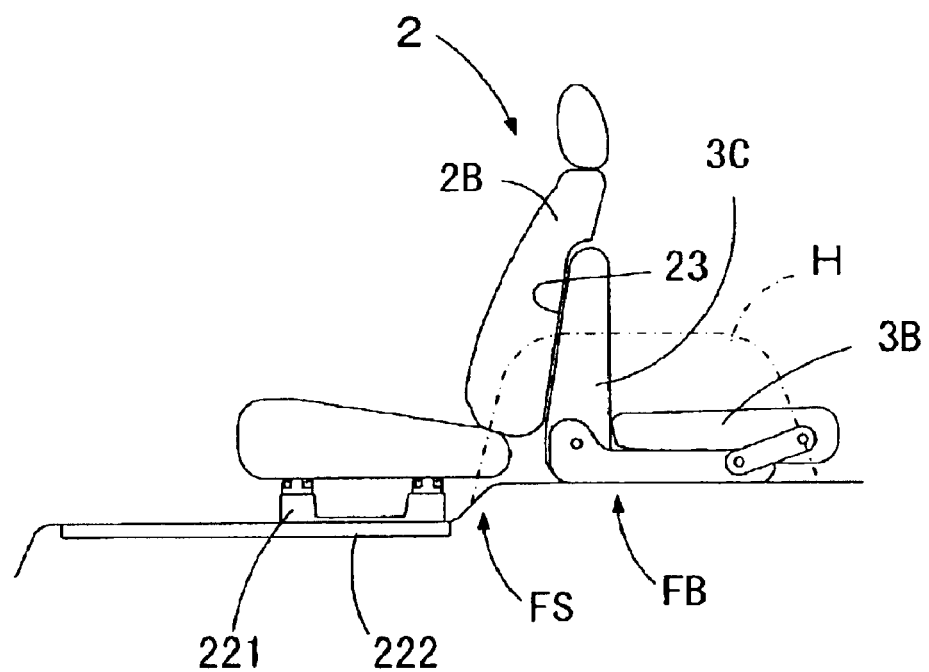
FIG. 4 is a schematic side view of the seat arrangement of the vehicle in the fourth mode as shown in FIG. 1(d)

As will be described later in detail with reference to FIG. 4, the contour of the second row seat 2 in the rearmost position overlaps with the rear wheel housing H when viewed from the vehicular side. The second row seat 2, when in the bench seat state, can rearwardly slide without interference with the rear wheel housing H. In place of providing the laterally sliding mechanism 21, the floor rail 222 of the longitudinally sliding mechanism 22 may be configured so as to guide the second row seats 2 to avert the rear wheel housing H. That is, the floor rail 222 may inboardly bend into the clearance between the rear wheel housings H, and guide the second row seats 2 to laterally approach each other as the seats 2 slide rearwardly, so that the seats 2 are displaced within the clearance between the rear wheel housings H at the rearmost position. Accordingly, the second row seats 2 can rearwardly slide without interference by the step FS between the front floor FA and the rear floor FB or the rear wheel housings H, thereby leaving a large space in front of the second row seats 2. The third row seats 3 are mounted on the rear floor FB in the manner described below.

The configuration of the third row seats 3 will now be described with reference to FIGS. 3(*a*) to 3(*c*). The description will be made for one of the left side seat, because the third row seats 3 comprise of a pair of seats laterally separated in the middle. Reference numerals are applied only to FIG. 3(*a*) and omitted in FIGS. 3(*b*) and (*c*), because the illustrated elements are common among FIGS. 3(*a*) to (*c*).

The third row seat 3 is mounted on the floor, or the rear floor FB, via a base member 4 and a link member 5. With the mounting members, the third row seat 3 can be arranged into three states of: the state in which a passenger can be seated thereon as shown in FIG. 3(*a*) (referred to herein as seating state); the state in which the seat cushion 3C has been upwardly pivoted about a pivotal axis in the vicinity of its front edge into the upright position and the seat back 3B has been forwardly pivoted into the face down position with the rear surface of the seat back 3B facing up as shown in FIG. 3(*b*) (referred to herein as upright and face down state); and the state in which both the seat cushion 3C and the seat back 3B have been substantially placed on the floor with their rear surfaces facing up (referred to herein as reversed state) as shown in FIG. 3(*c*). The seat cushion 3C and the seat back 3B can pivot separately from each other.

As described above, the third row seat 3 comprises the seat cushion 3C and the seat back 3B, and is supported by the base member 4 and the link member 5. Particularly, the base member 4 is fixed on the floor; the seat cushion 3C is supported by the base member 4 so as to pivot about a pivotal axis running laterally in the vicinity of its front edge; the link member 5 is pivotally supported in the vicinity of the rear end of the base member 4 at an end; and the seat back 3B is pivotally supported in the vicinity of the other end of the link member 5. Though FIG. 3 shows the base member 4 and the link member 5 provided on one side of the third row seat 3, those in symmetrical configuration are provided on the other side, which in cooperation, pivotally support the seat cushion 3C and the seat back 3B in the abovementioned manner.

A locking mechanism, as described later, is provided at a pivoting portion A between the base member 4 and the seat cushion 3C, for selectively locking the seat cushion 3C in the seating position, the upright position, or the reversed position. Also, locking mechanisms, not shown, are provided at a pivoting portion B between the base member 4 and the link member 5, and at a pivoting portion C between the link member 5 and the seat back 3B, for selectively locking the seat back in the seating position or the face down position. These locking mechanisms may be of well-known locking mechanisms used in conventional seat reclining mechanisms or seat folding mechanisms.

Figure 3:
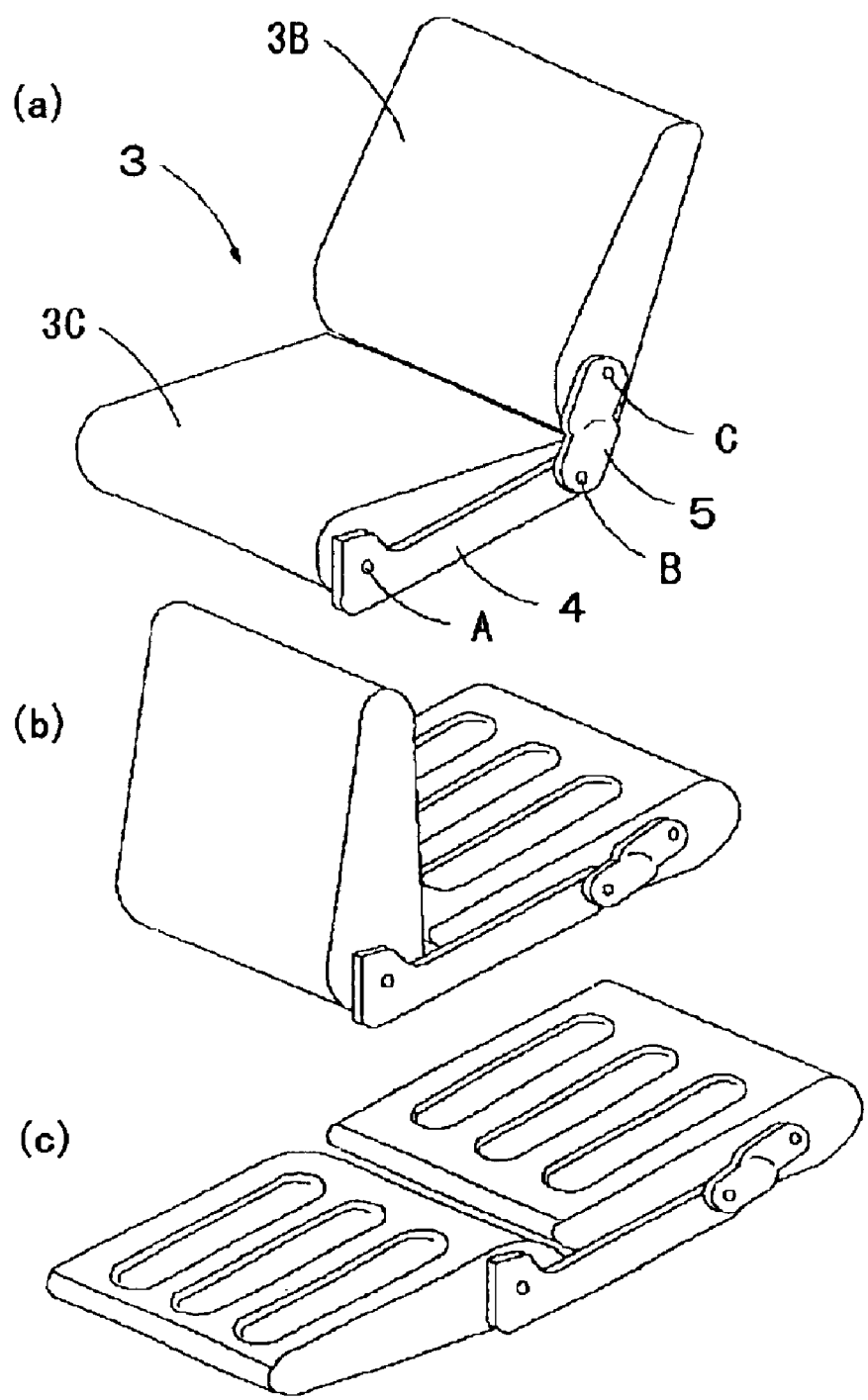
FIGS. 3(a)–(c) are perspective views showing the constitution and feasible arrangements of the third row seats.

In the seating state of the third row seat 3 shown in FIG. 3(*a*), pivoting the seat cushion 3C forwardly about the pivoting portion A into the upright position, and pivoting the seat back 3B forwardly about the pivoting portion C while pivoting the link member 5 rearwardly about the pivoting portion B result in the upright and face down state of the third row seat shown in FIG. 3(*b*). Then, in the upright and face down state shown in FIG. 3(*b*), pivoting the seat cushion 3C forwardly about the pivoting portion A into the reversed position results in the reversed state of the third row seat 3 shown in FIG. 3(*c*). As mentioned above, the seat cushion 3C and the seat back 3B can pivot separately from each other. The pivotal movement of the seat cushion 3C may be achieved by a link mechanism, in place of the pivoting portion A described above.

Accordingly, the provision of the second row seats 2 slidable in the described manner and the third row seats 3 capable of the arrangement in the described manner achieves various modes of seat arrangement in a vehicle, in accordance with the preferred embodiment of the present invention. That is, in the first mode shown in FIG. 1(*a*), arranging the third row seats 3 into the upright and face down state results in the second mode shown in FIG. 1(*b*). Then, in the second mode shown in FIG. 1(*b*), arranging the third row seats 3 into the reversed state results in the third mode shown in FIG. 1(*c*). Further, arranging the third row seats 3 into the upright and face down state and sliding rearwardly the second row seats 2 in the bench seat state result in the fourth mode shown in FIG. 1(d).

Particularly, the fourth mode shown in FIG. 1(d) is a novel mode of seat arrangements which offers a large legroom resulting from large rearward slide of the second seats 2 without interference with the rear wheel housings H or step FS on the floor, and offers an additional luggage area transformed from the area which had been occupied by the third row seats 3 via the arrangement of the third row seats 3. In the preferred embodiment, besides the above constructions of the second row seats 2 and the third row seats 3, additional features are incorporated in the second row seats 2 and the third row seats 3 for permitting the further rearward slide of the second row seats 2. Such features will now be described with reference to FIG. 4 showing a schematic side view of the vehicle in the fourth mode, or in the state illustrated in FIG. 1(d).

On the rear surface of the seat back 2B, a recess 23 is provided, which permits the seat cushion 3C in the upright position to fit into the recess 23 so that a padded surface of the seat cushion 3C and the rear surface of the second row seat 2 abut on each other, or closely contact with each other entirely with little or no clearance there between, when the second row seat fully slides in rearward. That is, the recess 23 permits the second row seats 2 to slide rearwardly further by the amount corresponding to the depth of the recess 23, compared to the case where the second row seat 2 merely has a planar rear surface without the recess 23. It should be noted that, in the condition above, the rear portion of the second row seat 2 is positioned so as to overlap the area above the rear floor FB and the rear wheel housing H when viewed from the vehicular side.

Accordingly, when the seat cushions 3C have been pivoted into the upright position and the second row seats 2 have been slid rearwardly, an area which had been occupied by the third row seats 3 can be used as a luggage area while the second row seats 2 are located further rearward. That is, as described above, the embodiment of the present invention features: the configuration which permits the seat backs 2B and the seat cushions 3C in the upright position to closely contact each other; the layout of the sliding rail 222 which permits the second row seats 2 to slide; the optimization of the height of the seat bases 221 guided by the rail 222; and the construction for permitting the second row seats 2 to be laterally displaced so as to rearwardly slide without the interference with the wheel housings H. As a result, even if a space is formed for accommodating the components beneath the rear floor FB, or the rear wheel housings H bulge out into the rear area of the cabin in a vehicle with the third row seats 3, the second row seats 2 is permitted to be positioned so as to overlap with the rear floor FB and rear wheel housings H without interference from them when the second row seats 2 are rearwardly slid to abut the seat cushions 3C in the upright position as shown in FIG. 4. Accordingly, an area which had been occupied by the third row seats can be used as a luggage area while a large space is obtained in front of the second row seats. In FIG. 4, the seat back 3B is shown being faced down, but may be upright.

Additionally, the pivoting portion A between the seat cushion 3C and the base member 4 may be arranged so that the foremost portion of the seat cushion 3C when the seat cushion 3C is in the upright position is located rearward of the foremost portion of the third row seat 3 in the seating state. This leaves a larger space behind the second row seat 2 when the seat cushion 3C is in the upright position, which permits further rearward slide of the second row seat 2.

In this embodiment, the shift of the seat cushion 3C from its seating position into its upright position is manually achieved by the direct pivoting operation of a passenger. Meanwhile, the shift of the seat cushion 3C from its reversed position into its upright position is automatically achieved by the rearward slide of the second row seat 2.

The mechanism for the automatic motion, or uprighting means will now be described for seats on the left side with respect to the vehicular longitudinal direction by way of example. Though similar seats are mounted on the right side with respect to the vehicular longitudinal direction, its description is omitted because the right and left seats are substantially symmetrically constructed.

The detailed elements and function of the uprighting means will now be described with reference to FIGS. 5 and 6. The seat cushion 3C is provided with an engaging lever 62 which can engage notches in a cam 61 fixed on the base member 4 of the third row seat 3. The engaging lever 62 is pivotally supported to the seat cushion 3C at its central portion. One end of the lever 62 is formed with an engaging portion, and the other end is connected to a button 64 via a rod 63. The button 64 is positioned at the frontal edge of the seat cushion 3C in the reversed position of the seat cushion 3C. Moreover, the engaging lever 62 is biased by a spring 65 in such a direction that the engaging portion engages the cam 61. Thus, depressing the button 64 causes the rod 63 to pivot the engaging lever 62, which releases the engagement between the engaging portion and the cam 61, so that the seat cushion 3C becomes free to rotate.

Figure 6:
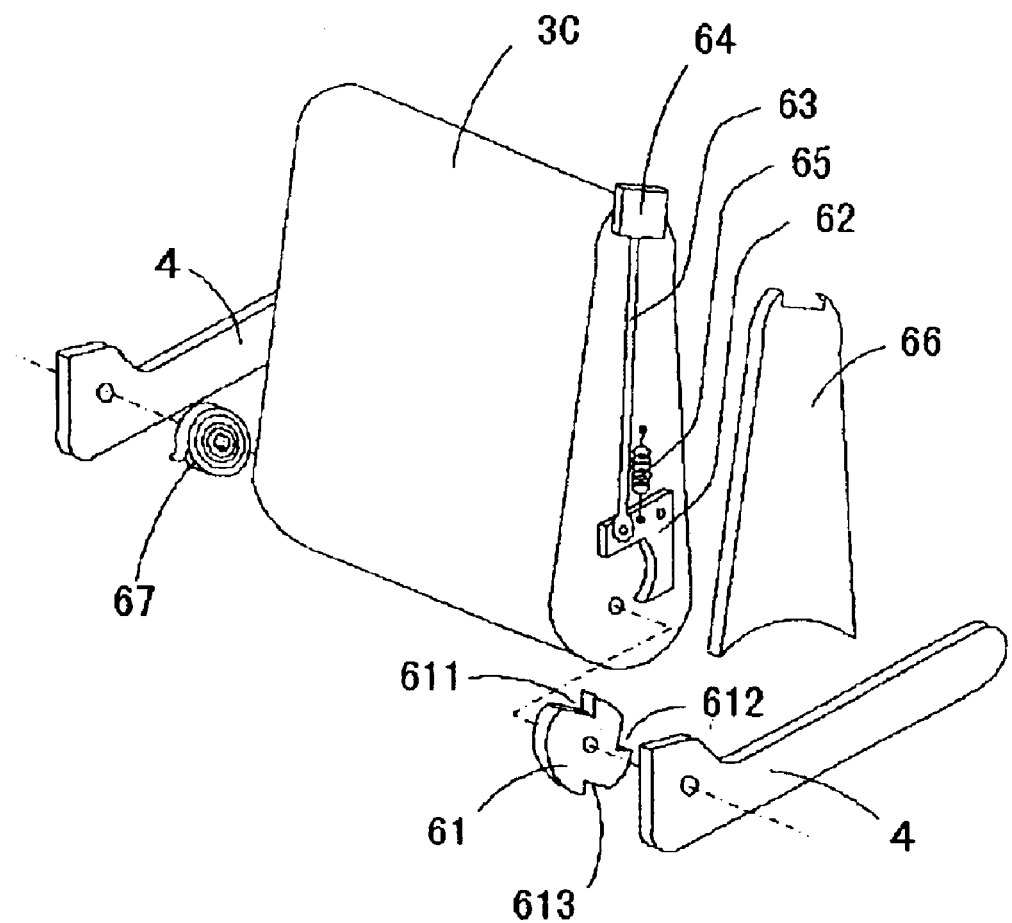
FIG. 6 is an exploded perspective view showing a pivoting portion between a base member and the seat cushion of the third row seat.

Particularly, as shown in FIG. 6 illustrating an exploded perspective view of the pivoting portion between the base member 4 and the seat cushion 3C, a spring 67 which biases the seat cushion 3C to rearwardly pivot is disposed between the seat cushion 3C and the base member 4. The side surface of the seat cushion 3C is provided with the button 64, the rod 63, the engaging lever 62, and the spring 65 as described above, which are covered with a cover 66 from the outside. The cam 61, which can engage the engaging lever 62, is fixed at the base member 4.

The engaging lever 62 and the cam 61 comprise a locking mechanism for selectively locking the seat cushion 3C of the third row seat 3 in the seating position, upright position, or the reversed position. That is, the cam 61 is formed with notches 611, 612 and 613 which correspond to the respective positions of the seat cushion 3C, thus the engagement between the respective notches 611 to 613 and the engaging portion of the engaging lever 61 maintains the seat cushion 3C in a selected position. The forward sides of the notches 611 to 613 with respect to the pivotal direction of the seat cushion 3C are at small angles to a contour of the cam 61 so as to allow the seat cushion 3C to forwardly pivot with the engaging portion being in contact with the cam 61. Thus, the seat cushion 3C is pivoted forwardly without any operation of the button 64, and on the other hand, is pivoted rearwardly with the button 64 being depressed.

Figure 5:
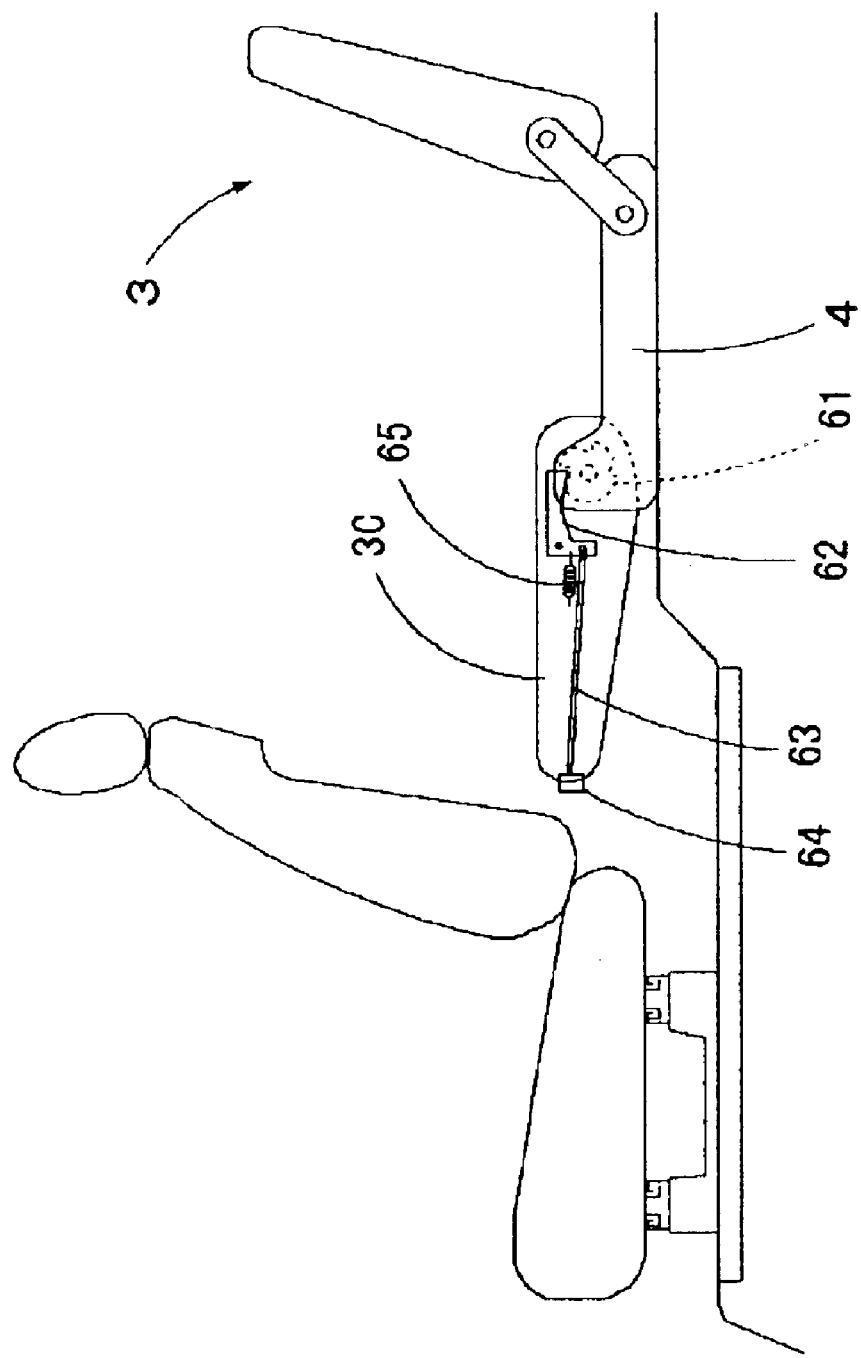
FIG. 5 is a schematic side view showing an uprighting means for rotating a seat cushion of a third row seat into an upright position.

Accordingly, in the reversed state of the third row seat 3 as shown in FIG. 5, when the second row seat 2 slides rearwardly until the rear edge of the second row seat 2 abuts on the frontal edge of the third row seat 3, the button 64 is depressed by the second row seat 2 because the button 64 is then positioned at the frontal edge of the seat cushion 3C. Thus, the depression of the button 64 releases the engagement between the engaging lever 62 and the cam 61, so that the seat cushion 3C is pivoted to the upright position by the biasing force of the spring 67. At this time, the button 64 is released from being depressed. However, the pivotal movement of the seat cushion 3C causes the engaging portion to climb onto the contour of the cam 61. Then, the engaging portion slides on the contour to engage again with the notch 612 corresponding to the upright position. That is, the rod 63 and the spring 65 constitute an interlocking means which interlocks the third row seat 3 with the second row seat 2 so that the rearward slide of the second row seat 2 releases the engagement between the engaging lever 62 and the notch 611 corresponding to the reversed position of the seat cushion 3C, and achieves the engagement between the engaging lever 62 and the notch 612 corresponding to the upright position of the seat cushion 3C. In addition, engaging lever 62 may be supported on the seat cushion 3C in any other manner whenever the movement of the rod 63 causes the engaging lever 62 to disengage from the notches 611 to 613.

Accordingly, when the seat cushion 3C is in its reversed position so as to provide the third mode shown in FIG. 1(c) for example, the rearward slide of the second row seat 2 causes the seat cushion 3C to rearwardly pivot to its upright position, thereby achieving the fourth mode shown in FIG. 1(d).

In addition to the above, for further convenience, the seat cushion 3C may be preferably interlocked with the second row seat 2 so as to be forwardly folded down automatically by the forward sliding of the second row seat 2. The mechanism for the automatic motion, or reversing means will now be described for seats on the left side with respect to the vehicular longitudinal direction by way of example. Though similar seats are mounted on the right side with respect to the vehicular longitudinal direction, its description is omitted because the right and left seats are substantially symmetrically constructed.

Figure 7:
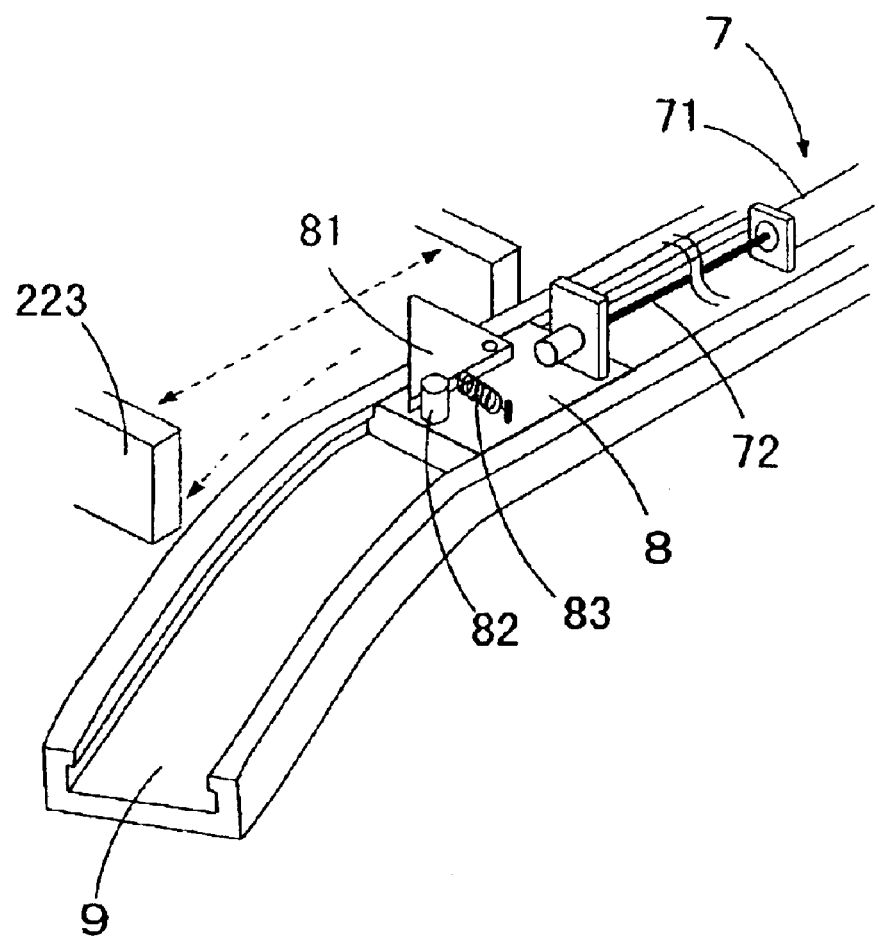
FIG. 7 is a perspective view showing a connection between an inner cable and a second row seat.
Figure 8:
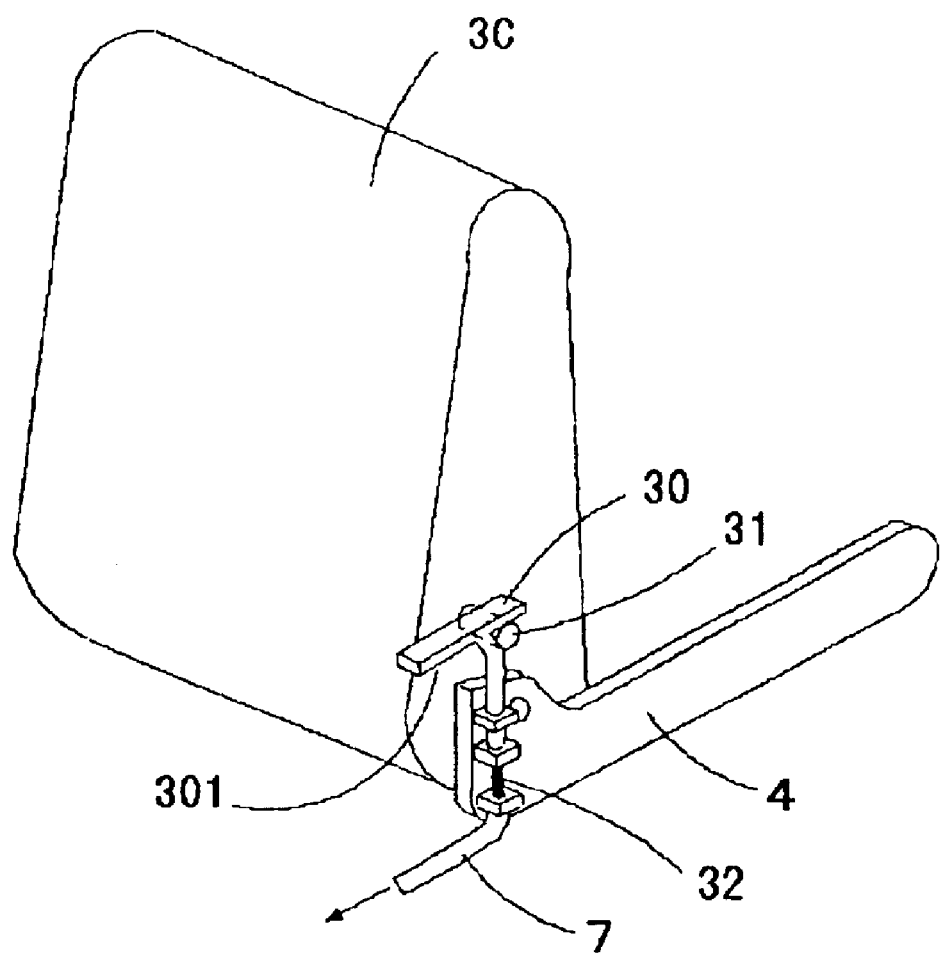
FIG. 8 is a perspective view showing a connection between a cable and a third row seat.

The detailed elements and function of the uprighting means will now be described with reference to FIGS. 7 and 8. Between the second row seat 2 and the seat cushion 3C, a cable 7 is disposed. The cable 7 comprises an outer cable 71 routed on the vehicular body and an inner cable 72 received in the outer cable 71. One end of the inner cable 72 is connected to the second row seat 2 via a mechanism described hereinafter. That is, as shown in FIG. 7 illustrating a perspective view of the connecting portion between the inner cable 72 and the second row seat 2, one end of the inner cable 72 is connected to an anchor 8 which slides along a sub rail 9. The rail 9 extends along the outboard side of the floor rail for the second row seat 2 and bends gradually away from the floor rail towards its frontal portion.

On the inboard side of the anchor 8, an abutment 81 is provided which can abut a projection 223 formed on the outboard surface of the seat base. The abutment 81 is horizontally supported to the anchor 8 pivotally, and is prohibited from pivoting past a predetermined angle by a stopper 82 on which the abutment 81 abuts. Moreover, the abutment 81 is biased by a spring 83 to pivot in such a direction as to abut the stopper 82. Further, the abutment 81 and the anchor 8, unless abutting the projection 223, are free to slide along the sub rail 9. The broken line with arrow heads in FIG. 7 indicates the sliding direction of the seat base or the projection 223.

In the meantime, the other end of the inner cable 72 is connected to the seat cushion 3C via a mechanism described hereinafter. That is, as shown in FIG. 8 illustrating a perspective view of the connecting portion between the cable 7 and the seat cushion 3C, the other end of the inner cable 72 is connected to a T-rod 30 which is supported to the base member 4 of the third row seat 3 vertically displaceably. The T-rod 30 is constructed so as to abut a projection 31 which is formed on the cover over the side surface of the seat cushion 3C. In addition, the T-rod 30 is biased by a spring 32 so as to pull the inner cable 72 towards the third row seat 3, and is prohibited from excessive upward displacement larger than a predetermined amount by a stopper not shown. Thus, when the abutment 81 formed on the anchor 8 of the second row seat 2 does not abut the projection 223, or when the anchor 8 is free to slide along the sub rail 9, the spring 32 constantly pulls the anchor 8 towards the third row seat 3, until the displacement of the rod 30 is blocked by the stopper (referred to herein as the initial state).

Accordingly, in the upright position of the seat cushion 3C of the third row seat 3, when the second row seat 2 forwardly slides from its rearmost position, or the projection 223 of the seat base 221 forwardly slides from the rear of the anchor 8, the abutment 81 is caused to forwardly slide while abutting the projection 223 on the seat base in the direction indicated by the dash-dotted line in FIG. 7, so that the inner cable 72 is pulled towards the second row seat 2. The displacement of the inner cable 72 being pulled towards the second row seat 2 causes the T-rod 30 on the third row seat 3 to downwardly move to abut the projection 31 formed on the side surface of the seat cushion 3C of the third row seat 3. The further forward slide of the second row seat causes the T-rod 30 to downwardly displace and pull the projection 31, so that the projection 31 is moved downwardly and forwardly along the lower surface 301 of the T-rod 30. As a result, the seat cushion 3C, unitarily formed with the projection 31, is forwardly pivoted. When the seat cushion 3C is pivoted into the reversed position, the locking mechanism described above which comprises the cam 61 and the engaging lever 62, locks the seat cushion 3C in the reversed position.

Further, when the second row seat 2 forwardly slides by a sufficient length for the seat cushion 3C to pivot into the reversed position, anchor 8 is moved along the sub rail 9 and displaced away from the projection 223 on the seat base. As a result, the abutment relationship between the anchor 8 and the projection 223 is eventually released, thereby restoring the inner cable 72, biased towards the third row seat 3, to the initial state.

In the meantime, when the second row seat 2 slides rearwardly in the upright position of the seat cushion 3C, because the abutment 81 is pivotally attached rearward to the anchor 8, the projection 223 of the seat base can pass over the abutment 81, despite the fact that the projection 223 of the seat base abuts the abutment 81. That is, the movement of the inner cable 72 towards the second row seat 2 which causes the seat cushion 3C of the third row seat 3 to pivot occurs only during the forward slide of the second row seat 2.

Accordingly, when the seat cushion 3C is in the upright position and the second row seat 2 is in the rearmost position so as to provide the fourth mode shown in FIG. 1(d) for example, the forward slide of the second row seat 2 causes the seat cushion 3C to forwardly pivot to the reversed position, thereby achieving the third mode shown in FIG. 1(c).

The action of the third row seat may alternatively be attained by an electrical system including a motor. In other words, the uprighting means may be achieved by the electrical system. The second embodiment which uses such an electrical system to provide the automatic motion for the third row seats 3 will now be described with reference to FIG. 9.

Figure 9:
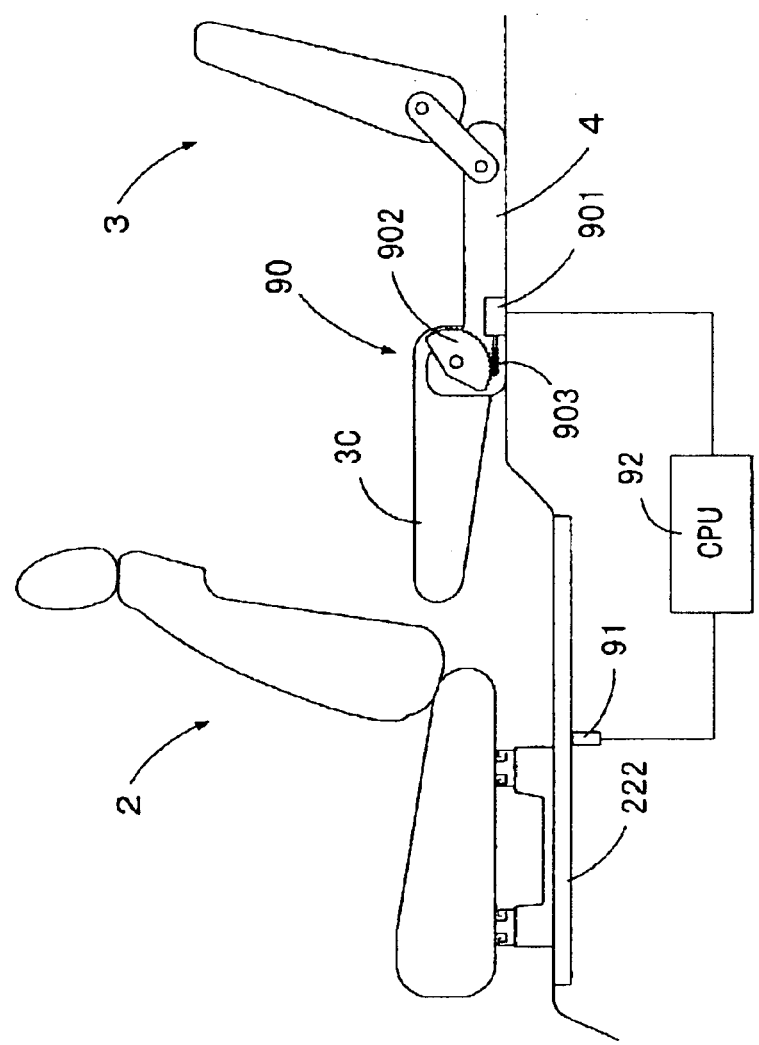
FIG. 9 is a schematic side view showing the second embodiment of the present invention.

FIG. 9 shows a schematic side view of the second embodiment. As shown, a motor mechanism 90, or an actuator is provided at the pivoting portion of the seat cushion 3C of the third row seat 3. The motor mechanism 90 comprises: an electrical motor 901 fixed on the vehicular floor; a spur gear 902 coaxially fixed to a pivotal shaft of the seat cushion 3C; and a worm gear 903 provided at a rotational shaft of the electrical motor 901 and engaging the spur gear 902. Below the floor rail 222 for the second row seat 2, a sensor 91 is provided. The sensor 91 is provided for detecting the location and sliding direction of the second row seat 2 in a conventional manner. For example, the optical sensor or electromagnetic sensor may be used to detect the location and movement of the seat 2. The electrical motor 901 and the sensor 91 is electrically connected to a control unit which is referred to herein as CPU 92. The CPU 92 receives electrical signal from the sensor 91 and transmits electrical signal to the electrical motor 901. Thus, the electrical motor 901 is actuated to rotate its rotational shaft and the worm gear 903 in accordance with the signal from the CPU 92.

When the second row seat 2 slides from its rearmost position to its foremost position while the seat cushion 3C is in the upright position, the sensor 91 detects the forward slide of the second row seat 2 and transmits a signal indicative of the forward slide. The CPU 92 receives the signal and transmits a signal to the electrical motor 901 for rotating the worm gear 903 in such a direction as to rotate the spur gear 902 counterclockwise. As a result, the seat cushion 3C is forwardly pivoted from the upright position into the reversed position.

On the other hand, when the second row seat 2 slides from its foremost position to its rearmost position while the seat cushion 3C is in reversed position, the sensor 91 detects the rearward slide of the second row seat 2 and transmits a signal indicative of the rearward slide. The CPU 92 receives the signal and transmits a signal to the electrical motor 901 for rotating the worm gear in such a direction as to rotate the spur gear 902 clockwise. As a result, the seat cushion 3C is rearwardly pivoted from the reversed position to the upright position.

This electrical system for pivoting the seat cushion 3C can properly adjust the action of the seat cushion such as rotating velocity in view of safety.

Although the present invention has been described in relation to particular embodiments thereof, many other variations and modifications and other uses will become apparent to those skilled in the art. It is preferred therefore, that the present invention be limited not by the specific disclosure herein, but only by the appended claims.

What is claimed is:

1. A seat arrangement for a vehicle, comprising:
a first row of seats with a driver seat and a front passenger seat; a second row of seats mounted behind the first row of seats in a cabin of the vehicle; and a third row of seats mounted behind the second row of seats in the cabin,
said second row of seats comprising: a second row seat comprising a substantially horizontally disposed seat cushion and a substantially vertically disposed seat back proximate to a rear edge of said seat cushion; and a sliding mechanism slidably supporting said second row seat in vehicular longitudinal direction between a forward position and a rearward position,
said third row of seats comprising: a third row seat comprising a seat cushion and a seat back; and a supporting mechanism supporting said third row seat so as to selectively permit said third row seat to be arranged into a first state where said seat cushion is substantially horizontal with its padded surface facing up and said seat back is substantially vertical with its padded surface facing forwardly, or a second state where said seat cushion is forwardly pivoted about a pivotal axis in the vicinity of a front edge of said seat cushion into a substantially upright position,
the vehicle including: a front floor on which said second row seat is mounted via said sliding mechanism; a rear floor on which the third row seat is mounted via said supporting mechanism; and a step connecting the front floor and the rear floor so that the rear floor is situated higher than the front floor, and
said sliding mechanism comprising: a rail extending on the front floor up to the vicinity of the step; and a slider guided by the rail and supporting said second row seat so that a lower surface of said second row seat is situated higher than the rear floor, at least the rear edge of said second row seat being located above the rear floor when said second row seat is in the rearward position,
wherein, a rear surface of said second row seat contacts substantially entirely with the padded surface of said seat cushion of the third row seat, when said third row seat is in the second state and said second row seat is slid to the rearward position; and
wherein said second row of seats comprises a right side seat and left side seat substantially laterally disposed, and a laterally displacing mechanism is provided on at least one of the right side seat and the left side seat for permitting at least one of the right side seat and the left side seat to be displaced between a state where the right side seat and the left side seats are laterally separated, and a state where the right side seat and the left side seat are disposed next to each other, the lateral length over the right side seat and the left side seat in the state where they are disposed next to each other being smaller than a clearance between rear wheel housings bulging out into the cabin of the vehicle from opposite sides, and said sliding mechanism and said laterally displacing mechanism are adapted to permit said second row seats to be positioned between the rear wheel housings with said second row seats laterally abutting on each other in the rearward position.

2. The seat arrangement for a vehicle as defined in claim 1, further including a recess formed on the rear surface of said seat back of said second row seat so that said seat cushion of said third row seat in the upright position fits therein when said third row seat is in the second state and said second row seat is slid to the rearward position.

3. The seat arrangement for a vehicle as defined in claim 1, wherein said laterally displacing mechanism is adapted to fix the right side seat and the left side seat in the state where they are laterally separated from each other in the forward position of said second row seats.

4. The seat arrangement for a vehicle as defined in claim 3, wherein said supporting mechanism is adapted to support said seat back of said third row seat so that said seat back is forwardly folded down onto the floor of the vehicle with its rear surface facing upwardly when said third row seat is in the second state.

5. The seat arrangement for a vehicle as defined in claim 4, wherein said supporting mechanism is adapted to support said seat cushion of said third row seat so that said seat cushion of said third row seat is in a third state of being forwardly pivoted about the pivotal axis in the vicinity of the front edge of said seat cushion of said third row seat into the substantially horizontal position with the padded surface of the seat cushion facing down, and a rear edge of said second row seat at the forward position is located ahead of the front edge of said seat cushion of said third row seat in the third state, the rear edge of said second row seat at the rearward position being located rearward of the front edge of said seat cushion of said third row seat in the third state.

6. A seat arrangement for a vehicle comprising:

a first row of seats with a driver seat and a front passenger seat, a second row of seats mounted behind the first row of seats in a vehicular cabin, and a third row of seats mounted behind the second row of seats in the cabin, the second row of seats comprising: a second row seat comprising a substantially horizontally disposed seat cushion and a substantially vertically disposed seat back proximate to a rear edge of said seat cushion; and a sliding mechanism slidably supporting said second row seat in vehicular longitudinal direction between a forward position and a rearward position, the third row of seats comprising: a third row seat comprising a seat cushion and a seat back; and a supporting mechanism which supports said seat cushion of said third row seat so as to selectively permit said seat cushion to be arranged into a seating position where said seat cushion is substantially horizontal with its padded surface facing up, an upright position where said seat cushion is pivoted about a pivotal axis disposed in the vicinity of the frontal edge of said seat cushion so as to be upright, or a reversed position where said seat cushion is pivoted about the pivotal axis so as to be horizontal with its padded surface facing down, the rear edge of said second row seat being located ahead of the frontal edge of said seat cushion of said third row seat in the reversed position when said second row seat is in the forward position, and being located rearward of the frontal edge of said seat cushion of said third row seat in the reversed position when said second row seat is in the rearward position, and uprighting means by which sliding of said second row seat from the forward position to the rearward position causes said seat cushion of said third row seat to shift into the upright position when said seat cushion of said third row seat is in the reversed position.

7. The seat arrangement for a vehicle as defined in claim 6, wherein said uprighting means comprises:

a spring biasing said seat cushion of said third row seat rearwardly about the pivotal axis;

a cam disposed on said supporting mechanism and formed with notches corresponding to the reversed position and the upright position of said seat cushion, respectively;

an engaging portion provided on said seat cushion and releasably engaging with said notch for selectively locking said seat cushion in the reversed position or the upright position corresponding to said respective notches; and interlocking means which interlocks said third row seat with said second row seat so that the rearward slide of said second row seat releases the engagement between said engaging portion and said notch corresponding to the reversed position, and achieves the engagement between said engaging portion and said notch corresponding to the upright position.

8. The seat arrangement for a vehicle as defined in claim 6, wherein said uprighting means comprises:

an actuator which rotates said seat cushion of said third row seat about the pivotal axis;

a sensor which detects the rearward slide of said second row seat; and a controller which is electrically connected with said actuator and said sensor, wherein, said controller sends a signal to said actuator for rotating said seat cushion in response to a signal from said sensor.

9. The seat arrangement for a vehicle as defined in claim 6, wherein said second row seat is adapted to forwardly slide while said seat cushion of said third row seat maintains the upright position when said second row seat is in the rearward position.

10. The seat arrangement for a vehicle as defined in claim 6, further including a reversing means which causes said seat cushion of said third row seat to shift into the reversed position in response to forward sliding of said second row seat, when said second row seat is in the rearward position and said seat cushion of said third row seat is in the upright position.

11. The seat arrangement for a vehicle as defined in claim 7, further including, reversing means via which the forward slide of said second row seat causes said seat cushion of said third row seat to shift into the reversed position, when said second row seat is in the rearward position and said seat cushion of said third row seat is in the upright position.

12. The seat arrangement for a vehicle as defined in claim 7, wherein said second row seat comprises a right side seat and left side seat substantially disposed laterally, a laterally displacing mechanism provided on at least one of the right side seat and the left side seat for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other is smaller than a clearance between rear wheel housings bulging out into the cabin of the vehicle from opposite sides, and said sliding mechanism and said laterally displacing mechanism are adapted to permit said second row seats to be positioned between the rear wheel housings with said second row seats laterally abutting each other in the rearward position.

13. The seat arrangement for a vehicle as defined in claim 8, wherein said second row seat comprises a right side seat and left side seat substantially disposed laterally, a laterally displacing mechanism provided on at least one of the right side seat and the left side seat for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other is smaller than a clearance between rear wheel housings bulging out into the cabin of the vehicle from opposite sides, and said sliding mechanism and said laterally displacing mechanism are adapted to permit said second row seats to be positioned between the rear wheel housings with said second row seats laterally abutting each other in the rearward position.

14. The seat arrangement for a vehicle as defined in claim 9, wherein said second row seat comprises a right side seat and left side seat substantially disposed laterally, a laterally displacing mechanism provided on at least one of the right side seat and the left side seat for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other is smaller than a clearance between rear wheel housings bulging out into the cabin of the vehicle from opposite sides, and said sliding mechanism and said laterally displacing mechanism are adapted to permit said second row seats to be positioned between the rear wheel housings with said second row seats laterally abutting each other in the rearward position.

15. The seat arrangement for a vehicle as defined in claim 10, wherein said second row seat comprises a right side seat and left side seat substantially disposed in lateral, a laterally displacing mechanism provided on at least one of the right side seat and the left side seat for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other is smaller than a clearance between rear wheel housings bulging out into the cabin of the vehicle from opposite sides, and said sliding mechanism and said laterally displacing mechanism permit said second row seats to be positioned between the rear wheel housings with said second row seats laterally abutting each other in the rearward position.

16. The seat arrangement for a vehicle as defined in claim 11, wherein said second row seat comprises a right side seat and left side seat substantially disposed laterally, a laterally displacing mechanism provided on at least one of the right side seat and the left side seat for permitting at least one of the right side seat and the left side seat to be displaced between a state where the right side seat and the left side seats are laterally separated, and a state where the right side seat and the left side seat are disposed next to each other, wherein the lateral length over the right side seat and the left side seat in the state where they are disposed next to each other is smaller than a clearance between rear wheel housings bulging out into the cabin of the vehicle from opposite sides, and said sliding mechanism and said laterally displacing mechanism permit said second row seats to be positioned between the rear wheel housings with said second row seats laterally abutting each other in the rearward position.

17. A seat arrangement for a vehicle comprising:

a first row of seats with a driver seat and a front passenger seat, a second row of seats mounted behind the first row of seats in a vehicular cabin, and a third row of seats mounted behind the second row of seats in the cabin, the second row of seats comprising: a second row seat comprising a seat cushion disposed substantially horizontally and a seat back substantially vertically disposed proximate to a rear edge of said seat cushion; a fixed rail fixed on a vehicular floor and extending in a vehicular longitudinal direction; and a slidable portion fixed on a lower surface of said seat cushion of said second row seat and received in said fixed rail so that said second row seat slides between a forward position and a rearward position, and the third row of seats comprising: a third row seat comprising a seat cushion and a seat back, and a base member fixed on the vehicular floor and pivotably supporting said third row seat so as to selectively permit said third row seat to be arranged into a first state where said seat cushion is substantially horizontal with its padded surface facing up and said seat back is substantially vertical with its padded surface facing forwardly, a second state where said seat cushion is forwardly pivoted about a pivotal axis proximate to a front edge of said seat cushion into a substantially upright position, or a third state where said seat cushion of said third row seat is forwardly pivoted about the pivotal axis proximate to the front edge of said seat cushion into a substantially horizontal position with the padded surface of said seat cushion facing down, wherein the rear edge of said second row seat at the forward position is located ahead of the front edge of said seat cushion of said third row seat in the third state, and the rear edge of said second row seat at the rearward position is located rearward of the front edge of said seat cushion of said third row seat in the third state.

18. The seat arrangement for a vehicle as defined in claim 17, further comprising:

a spring biasing said seat cushion of said third row seat rearwardly about the pivotal axis;

a cam disposed on said supporting mechanism and formed with notches corresponding to the reversed position and the upright position of said seat cushion, respectively;

an engaging lever movably supported on said seat cushion and releasably engaging said notch for selectively locking said seat cushion in the reversed position or the upright position corresponding to said respective notches;

a rod disposed in said seat cushion with an end of said rod being connected to said engaging lever and the other end of said rod being located proximate to the front edge of said seat cushion in the reversed position so that said engaging lever is moved to disengage from said notch when the other end of said rod is pushed in the axial direction.

19. A seat arrangement for a vehicle, comprising:

a first row of seats with a driver seat and a front passenger seat, a second row of seats mounted behind the first row of seats in a cabin of the vehicle, said second row of seats comprising: a second row seat comprising a substantially horizontally disposed seat cushion and a substantially vertically disposed seat back proximate to a rear edge of said seat cushion; and a sliding mechanism slidably supporting said second row seat in vehicular longitudinal direction between a forward position and a rearward position, and a third row of seats mounted behind the second row of seats in the cabin, said third row of seats comprising: a third row seat comprising a seat cushion and a seat back; and a supporting mechanism supporting said third row seat so as to selectively permit said third row seat to be arranged into a first state where said seat cushion is substantially horizontal with its padded surface facing up and said seat back is substantially vertical with its padded surface facing forwardly, or a second state where said seat cushion is forwardly pivoted about a pivotal axis in the vicinity of a front edge of said seat cushion into a substantially upright position, a rear surface of said second row seat contacting substantially entirely with the padded surface of said seat cushion of the third row seat when said third row seat is in the second state and said second row seat is slid to the rearward position, wherein a recess is formed on the rear surface of said seat back of said second row seat so that said seat cushion of said third row seat in the upright position fits therein with an upper end of said seat cushion of the third row seat being located below an upper end of said seat back of the second row seat when said third row seat is in the second state and said second row seat is slid to the rearward position, said recess formed on the rear surface of said seat back of the second row seat being configured such that an upper end portion of the recess is located substantially at the same level as said upper end of said seat cushion of the third row seat in said second state.

20. The seat arrangement for a vehicle as defined in claim 19, wherein said padded surface of said seat cushion of the third row seat is formed substantially flat.

21. A seat arrangement for a vehicle, comprising:

a first row of seats with a driver seat and a front passenger seat, a second row of seats mounted behind the first row of seats in a cabin of the vehicle, said second row of seats comprising: a second row seat comprising a substantially horizontally disposed seat cushion and a substantially vertically disposed seat back proximate to a rear edge of said seat cushion; and a sliding mechanism slidably supporting said second row seat in vehicular longitudinal direction between a forward position and a rearward position, a third row of seats mounted behind the second row of seats in the cabin, said third row of seats comprising: a third row seat comprising a seat cushion and a seat back; and a supporting mechanism supporting said third row seat so as to selectively permit said third row seat to be arranged into a first state where said seat cushion is substantially horizontal with its padded surface facing up and said seat back is substantially vertical with its padded surface facing forwardly, or a second state where said seat cushion is forwardly pivoted about a pivotal axis in the vicinity of a front edge of said seat cushion into a substantially upright position, a rear surface of said second row seat contacting substantially entirely with the padded surface of said seat cushion of the third row seat when said third row seat is in the second state and said second row seat is slid to the rearward position, the vehicle including: a front floor on which said second row seat is mounted via said sliding mechanism; a rear floor on which the third row seat is mounted via said supporting mechanism; and a step connecting the front floor and the rear floor so that the rear floor is situated higher than the front floor, and said sliding mechanism comprising: a rail extending on the front floor up to the vicinity of the step; and a slider guided by the rail and supporting said second row seat so that a lower surface of said second row seat is situated higher than the rear floor, wherein at least the rear edge of said second row seat is positioned so as to overlap an area above the rear floor when said second row seat is in the rearward position.

* * * * *